United States Patent
Engelbart et al.

(10) Patent No.: US 10,937,006 B2
(45) Date of Patent: Mar. 2, 2021

(54) METHOD AND SYSTEM FOR EVALUATING CORROSION LOSS

(71) Applicant: The Boeing Company, Chicago, IL (US)

(72) Inventors: Roger W. Engelbart, Berkeley, MO (US); Taisia Tsukruk Lou, Olivette, MO (US)

(73) Assignee: The Boeing Company, Chicago, IL (US)

( * ) Notice: Subject to any disclaimer, the term of this patent is extended or adjusted under 35 U.S.C. 154(b) by 508 days.

(21) Appl. No.: 15/619,188

(22) Filed: Jun. 9, 2017

(65) Prior Publication Data

US 2018/0357613 A1 Dec. 13, 2018

(51) Int. Cl.
| | |
|---|---|
| *G06Q 10/00* | (2012.01) |
| *G06Q 10/06* | (2012.01) |
| *G06T 7/00* | (2017.01) |
| *G01N 17/00* | (2006.01) |

(52) U.S. Cl.
CPC .......... *G06Q 10/20* (2013.01); *G01N 17/006* (2013.01); *G06Q 10/06311* (2013.01); *G06Q 10/06395* (2013.01); *G06T 7/001* (2013.01); *G06T 2207/30136* (2013.01)

(58) Field of Classification Search
CPC ............. G06Q 10/20; G06Q 10/06311; G06Q 10/06395; G01N 17/006; G01N 23/203; G01N 23/201; G06T 7/001; G06T 2207/30136; B64F 5/60
See application file for complete search history.

(56) References Cited

U.S. PATENT DOCUMENTS

| | | | | |
|---|---|---|---|---|
| 4,998,208 A | * | 3/1991 | Buhrow | F17D 5/00 702/34 |
| 5,455,777 A | * | 10/1995 | Fujiyama | G01N 17/00 702/34 |
| 6,657,429 B1 | * | 12/2003 | Goldfine | G01B 7/16 324/232 |
| 7,508,910 B2 | | 3/2009 | Safai et al. | |
| 7,623,626 B2 | | 11/2009 | Safai et al. | |
| 7,649,976 B2 | | 1/2010 | Georgeson et al. | |
| 8,094,781 B1 | | 1/2012 | Safai et al. | |
| 8,761,338 B2 | | 6/2014 | Safai | |
| 8,873,711 B2 | | 10/2014 | Engelbart et al. | |
| 8,958,408 B1 | | 2/2015 | Jain et al. | |
| 8,981,285 B2 | | 3/2015 | Scholes et al. | |

(Continued)

*Primary Examiner* — Manuel L Barbee
(74) *Attorney, Agent, or Firm* — The Small Patent Law Group LLC; Joseph M. Butscher

(57) ABSTRACT

A method, system and computer program product are provided in order to evaluate corrosion loss and to establish maintenance actions based thereupon. In the context of a method, a structure is inspected to generate corrosion information and a corrosion model of the structure is generated based upon the corrosion information. The method also includes generating a combined corrosion model based upon the corrosion model and a baseline model of the structure including material types and thicknesses at respective locations on the structure. The method further includes establishing maintenance actions including modification of an inspection interval based upon the combined corrosion model. Corresponding systems and computer program products are also provided.

20 Claims, 8 Drawing Sheets

(56) References Cited

U.S. PATENT DOCUMENTS

| | | |
|---|---|---|
| 9,036,781 B1 | 5/2015 | Safai et al. |
| 9,128,030 B1 | 9/2015 | Safai et al. |
| 9,151,721 B2 | 10/2015 | Safai |
| 9,398,676 B2 | 7/2016 | Grimshaw et al. |
| 9,506,879 B2 | 11/2016 | Engelbart et al. |
| 9,594,033 B2 | 3/2017 | Georgeson |
| 9,658,173 B2 | 5/2017 | Georgeson et al. |
| 2004/0251920 A1* | 12/2004 | Engelbart ............... G01N 22/02 324/700 |
| 2014/0064459 A1 | 3/2014 | Wahl et al. |
| 2015/0055757 A1* | 2/2015 | Engelbart ............ G01N 17/043 378/89 |
| 2015/0100571 A1* | 4/2015 | Floyd .................. G06F 16/9537 707/724 |
| 2015/0323477 A1 | 11/2015 | Edwards et al. |

* cited by examiner

METHOD AND SYSTEM FOR EVALUATING CORROSION LOSS

TECHNOLOGICAL FIELD

An example embodiment of the present disclosure relates generally to the evaluation of corrosion loss of a structure and, more particularly, to a method, system and computer program product for evaluating corrosion loss and for establishing maintenance actions including, for example, modification of an inspection interval based thereupon.

BACKGROUND

Various structures are inspected over time to identify corrosion loss that may impair the structural integrity of the structure if left unaddressed. The structures may be inspected in accordance with a predefined schedule and, in instances in which corrosion loss is identified, appropriate repairs or replacement of the structure may be scheduled.

By way of example, aircraft are generally inspected on a periodic basis in an effort to identify corrosion, particularly in areas of the aircraft that are known to be susceptible to corrosion loss. Historically, these inspections were conducted visually. In some instances, however, portions of the aircraft to be inspected were hidden from view or were otherwise of limited access. Corrosion may occur in these areas of limited access since moisture may intrude and be retained within these areas. However, the corrosion may be unable to be detected visually, at least without significant disassembly of the respective portion of the aircraft.

With respect to these portions of limited access, adjacent portions of the aircraft may be inspected without disassembly of the aircraft and then the condition of the portion of the aircraft that is hidden from view may be deduced based upon the condition of the adjacent portions of the aircraft. Alternatively, the portion of the aircraft that is of limited access may be disassembled to permit more direct inspection, albeit at the cost of disassembly.

For example, the wing skin beneath a known beavertail fitting is of limited access and may be inspected by visually inspecting the wing skin proximate the beavertail fitting. In this regard, the wing skin proximate the beavertail fitting may be examined visually for signs of corrosion, such as discoloration, corrosion products and/or pitting. If pitting or other material loss is evident, manual depth measurements may be made to determine whether the metal loss is severe enough to warrant removal and replacement of the wing skin. Included in this assessment is an assumption that if the corrosion is visible, the wing skin beneath the beavertail fitting may also be experiencing the effects of corrosion. However, the only way to confirm these assumptions regarding the state of the wing skin beneath the beavertail fitting is to remove the entire fitting from the wing skin, thereby requiring more extensive downtime for the aircraft.

As such, non-destructive inspection methods, such as radiography, ultrasonic or eddy current inspection methods, have been developed, particularly for the inspection of areas of limited access. The type of inspection technique is generally dependent upon the type of anomaly to be detected within the structure, the type of material that forms the aircraft, the portion of the aircraft undergoing inspection and/or the complexity of the structure in or around the portion of the aircraft undergoing the inspection. With respect to the foregoing example of a known beavertail fitting, an x-ray backscatter technique may be utilized in order to inspect the wing skin from one side for metal loss without removal of the fitting.

Once corrosion has been detected by either a visual inspection or by a non-destructive inspection method, typical maintenance protocol requires that some level of action be taken. This action may be further monitoring of the area experiencing corrosion such as at more frequent intervals followed by removal of the corrosion and repair of the affected area or replacement of that part of the structure including the area experiencing corrosion once the corrosion has become severe. However, the further monitoring of the area experiencing corrosion at a more frequent interval is time consuming and may require that the structure is taken out of service during the inspection. Moreover, in instances in which the further monitoring is performed with non-destructive inspection methods, the further monitoring of the structure may only be performed in those locations that include the necessary equipment to perform the non-destructive inspection method. With respect to aircraft, for example, the more frequent monitoring may require that the aircraft be scheduled for more frequent layovers at the repair depots that are capable of conducting the non-destructive inspection of the aircraft, thereby complicating the aircraft scheduling process or removing the aircraft from service more often.

BRIEF SUMMARY

A method, system and computer program product are provided in accordance with an example embodiment in order to evaluate corrosion loss and to establish maintenance actions based thereupon. In this regard, the method, system and computer program of an example embodiment provide an illustration of the maintenance actions to be taken for different portions of the structure, thereby facilitating planning for and implementation of the maintenance actions. For example, the method, system and computer program product of an example embodiment may encourage the ordering of spares in order to facilitate the timely repair of the structure. With respect to the potential maintenance actions, the method, system and computer program product of an example embodiment may modify an inspection interval. In instances in which the inspection interval is lengthened, the method, system and computer program product of an example embodiment may reduce the resources expended upon inspections and limit the time that the underlying structure may be out of service during an inspection.

In an example embodiment, a method is provided for evaluating corrosion loss. The method includes inspecting a structure to generate corrosion information and generating a corrosion model of the structure based upon the corrosion information. The method also includes generating a combined corrosion model based upon the corrosion model and a baseline model of the structure including material types and thicknesses at respective locations on the structure. The method further includes establishing maintenance actions including modification of an inspection interval based upon the combined corrosion model.

The method of an example embodiment also includes depicting an image of the structure and highlighting one or more areas of the image of the structure to represent respective maintenance actions. The method of this example embodiment also includes modifying the highlighting of the one or more areas of the image of the structure to represent changes in the respective maintenance actions to be taken over time. In regards to highlighting the one or more areas of the image of the structure, the method may also include causing the one or more areas of the image of the structure to be depicted in a color, style, shading, pattern or with another visible characteristic associated with the respective maintenance action.

In an example embodiment, the combined corrosion model is further based upon an environment in which the structure is disposed. The method of an example embodiment modifies the inspection interval by accessing a maintenance schedule for the structure and modifying the maintenance schedule for the structure. Additionally or alternatively, the method of an example embodiment establishes maintenance actions by identifying a repair to be made to the structure, causing a spare part for the structure to be ordered or identifying at least a portion of the structure to be replaced. In an example embodiment in which establishing the maintenance actions includes identifying a repair to be made to the structure, the method may also include determining a size of the repair based upon the combined corrosion model and sizing a repair patch based upon the size of the repair.

In another example embodiment, a system is provided for evaluating corrosion loss. The system includes an inspection system, such as an x-ray inspection system, configured to inspect a structure to generate corrosion information. The system also includes a computing device configured to generate a corrosion model of the structure based upon the corrosion information. The computing device is also configured to generate a combined corrosion model based upon the corrosion model and a baseline model of the structure including material types and thicknesses at respective locations on the structure. The computing device is further configured to establish maintenance actions including modification of an inspection interval based upon the combined corrosion model.

The computing device of an example embodiment is further configured to cause an image of the structure to be depicted and to cause one or more areas of the image of the structure to be highlighted to represent respective maintenance actions. The computing device of this example embodiment may be further configured to modify highlighting of the one or more areas of the image of the structure to represent changes in the respective maintenance actions to be taken over time. The computing device of this example embodiment may be further configured to cause the one or more areas of the image of the structure to be highlighted by causing the one or more areas of the image of the structure to be depicted in a color, style, shading, pattern or with another visible characteristic associated with the respective maintenance action.

In an example embodiment, the computing device is further configured to generate the combined corrosion model based upon an environment in which the structure is disposed. The computing device may be further configured to modify the inspection interval by accessing a maintenance schedule for the structure and modifying the maintenance schedule for the structure. Additionally or alternatively, the computing device may be further configured to establish maintenance actions by identifying a repair to be made to the structure, causing a spare part for the structure to be ordered or identifying at least a portion of the structure to be replaced. The computing device of an example embodiment is further configured to establish the maintenance actions by identifying a repair to be made to the structure. In this example embodiment, the computing device is further configured to determine a size of the repair based upon the combined corrosion model and size a repair patch based upon the size of the repair.

In a further example embodiment, a computer program product is configured to evaluate corrosion loss. The computer program product includes a non-transitory computer readable storage medium comprising instructions that, when executed, are configured to cause a corrosion model of a structure to be generated based upon corrosion information collected during an inspection of the structure. The instructions, when executed, are also configured to generate a combined corrosion model based upon the corrosion model and a baseline model of the structure including material types and thicknesses at respective locations on the structure. The instructions, when executed, are further configured to establish maintenance actions including modification of an inspection interval based upon the combined corrosion model.

The instructions of an example embodiment are also configured, when executed, to depict an image of the structure and to highlight one or more areas of the image of the structure to represent respective maintenance actions by causing the one or more areas of the image of the structure to be depicted in a color, style, shading, pattern or with another visible characteristic associated with the respective maintenance action. In this example embodiment, the instructions, when executed, may also be configured to cause modification of the highlighting of the one or more areas of the image of the structure to represent changes in the respective maintenance actions to be taken over time.

BRIEF DESCRIPTION OF THE DRAWINGS

Figure 1:
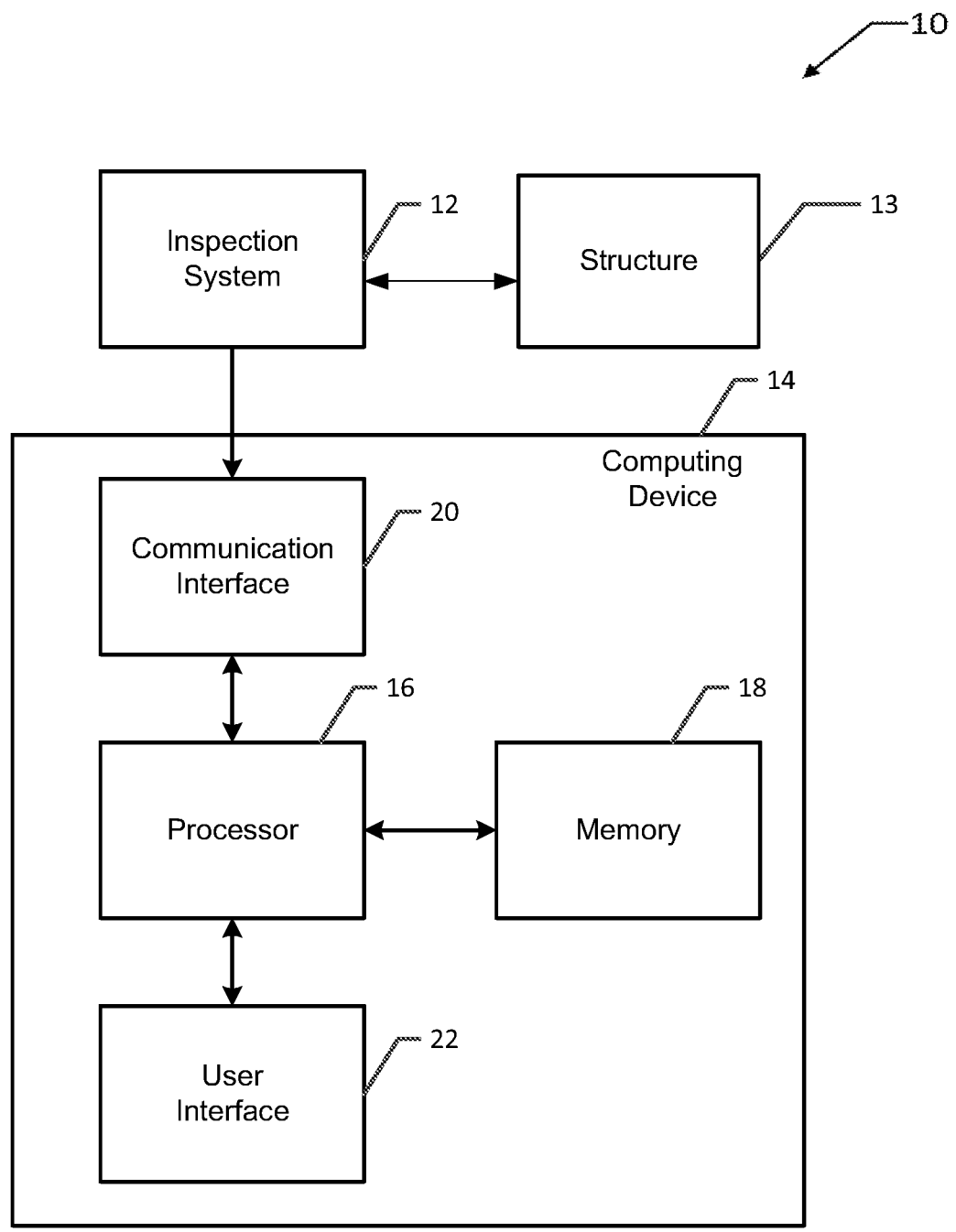
Figure 2:
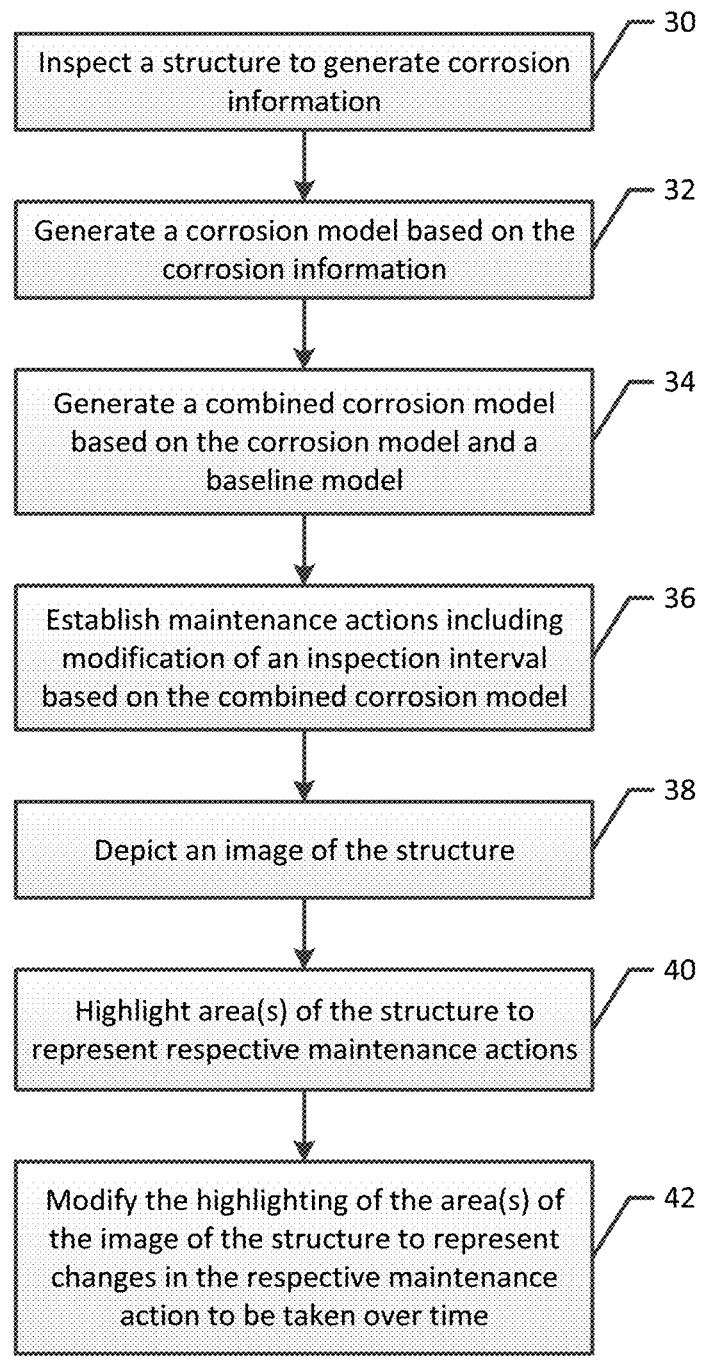
Figure 3:
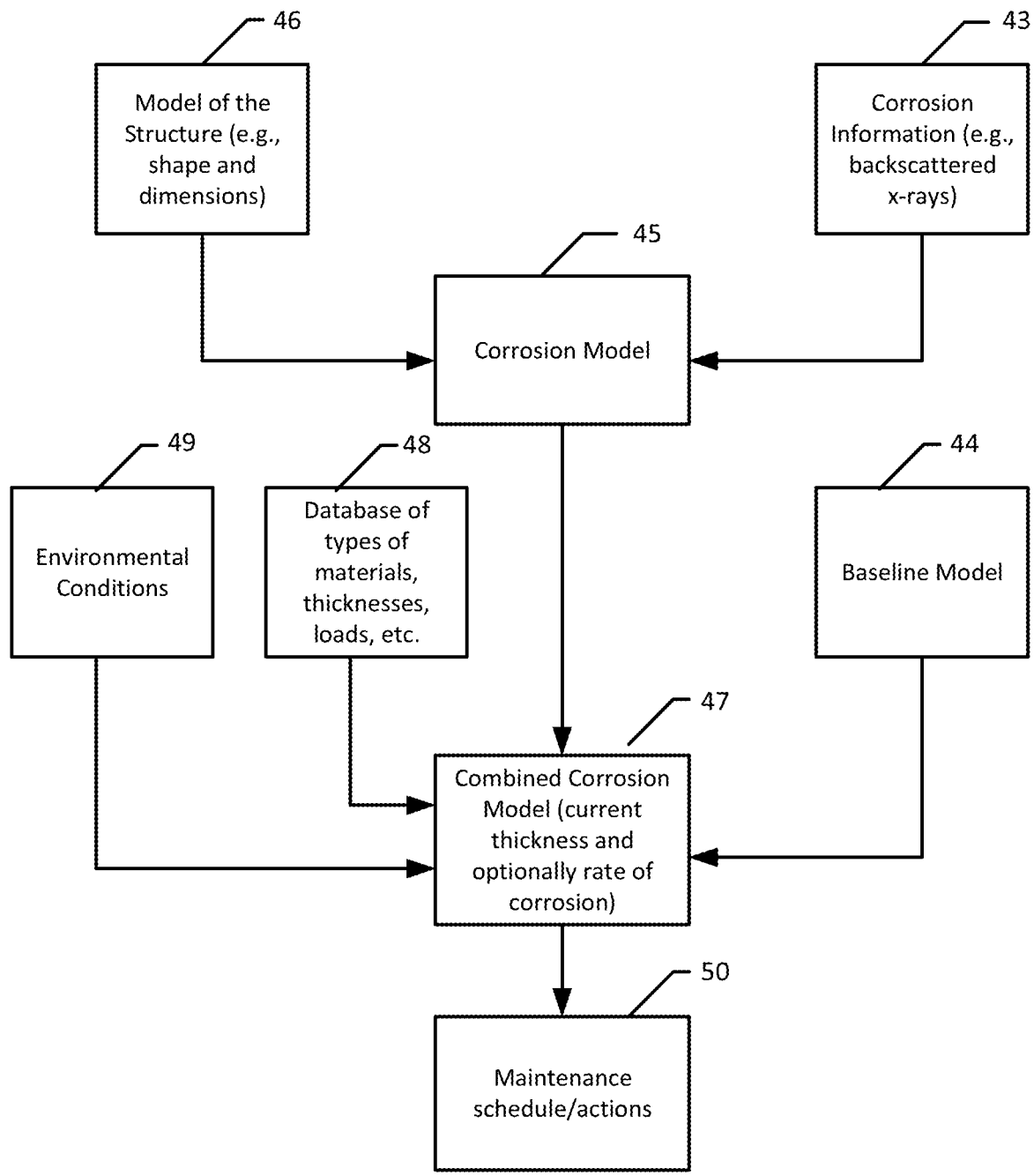
Figure 4:
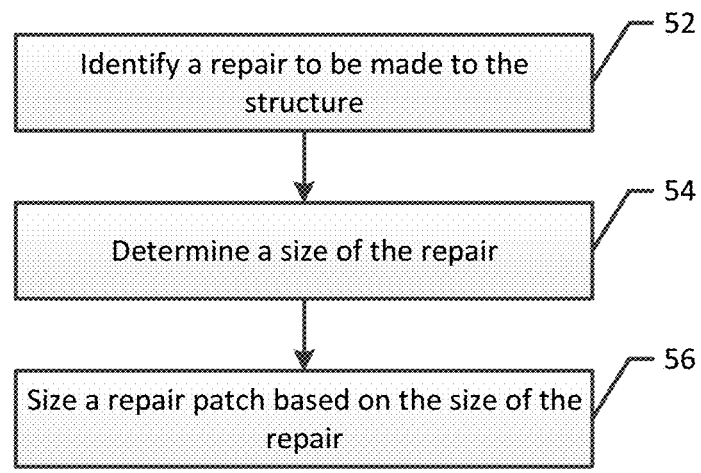
Figure 5:
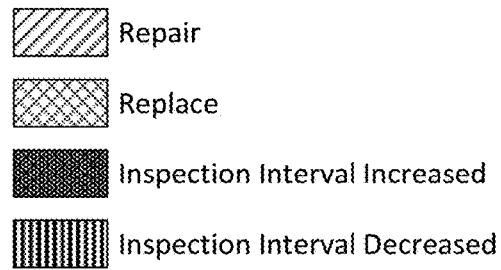
Figure 5:
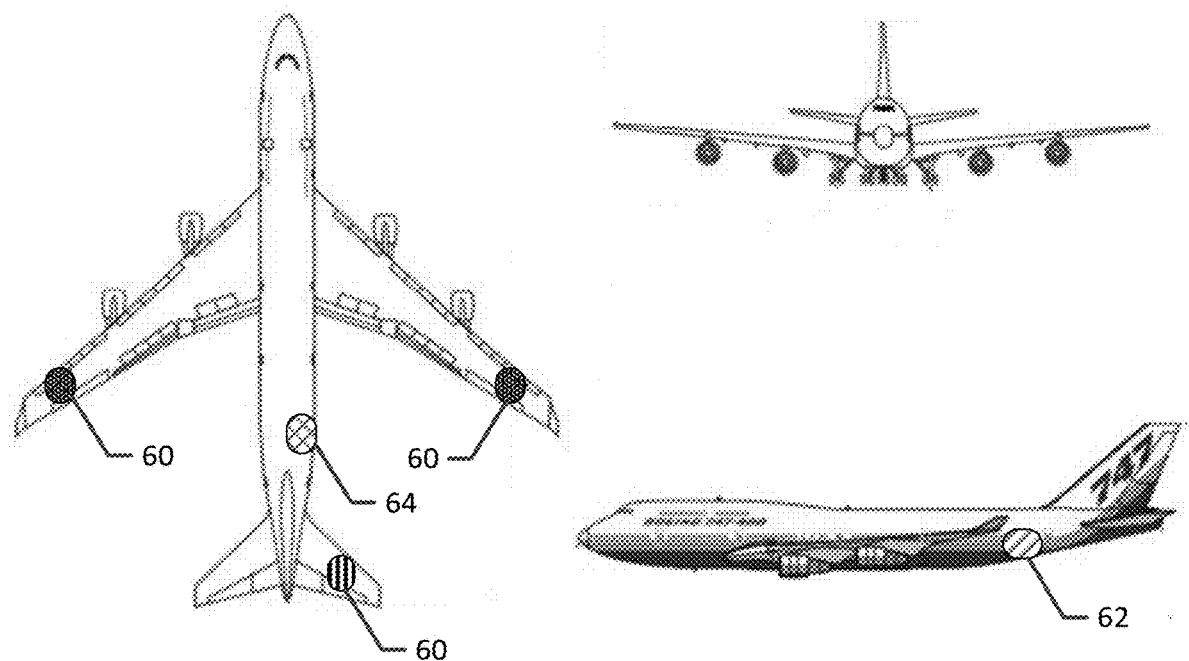
Figure 6:
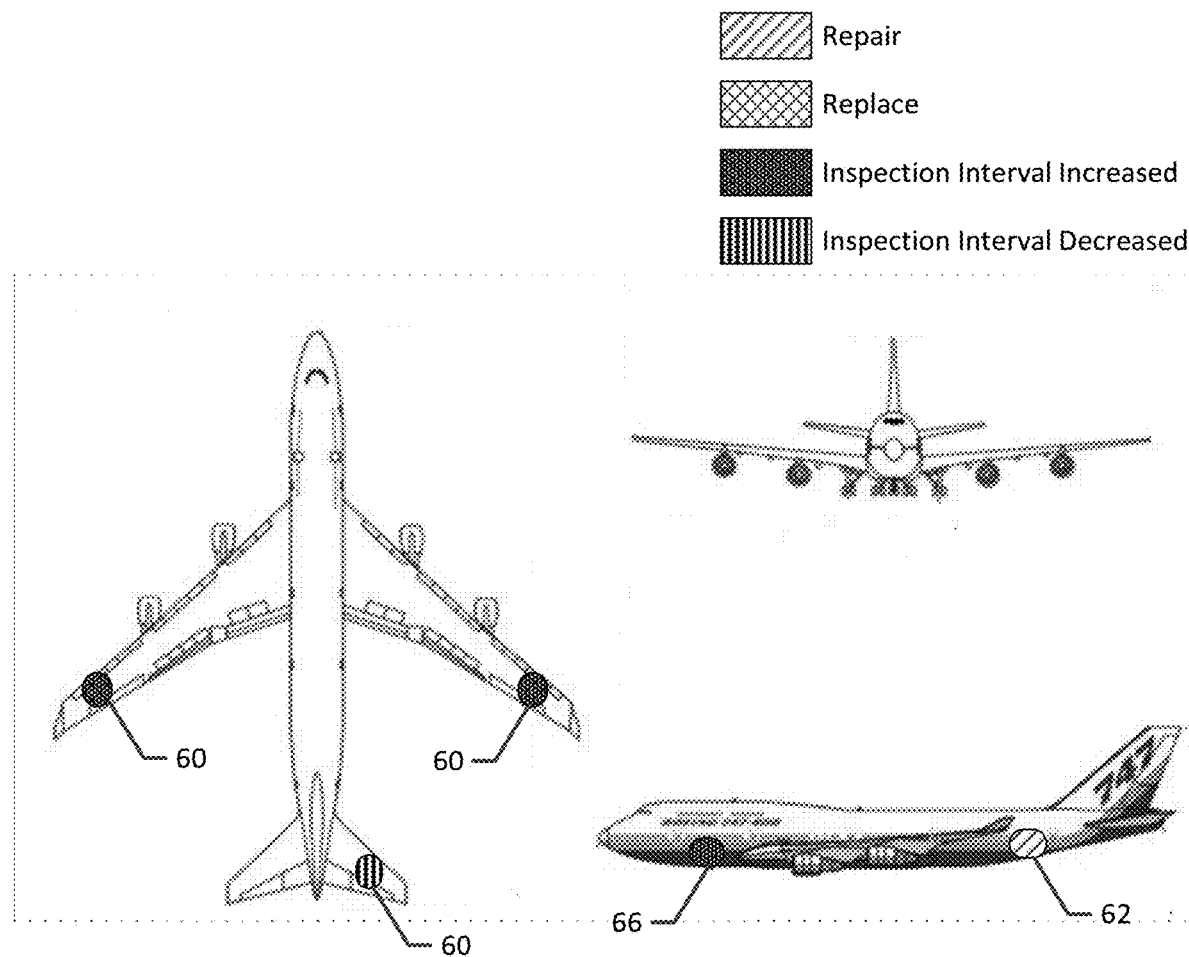
Figure 7:
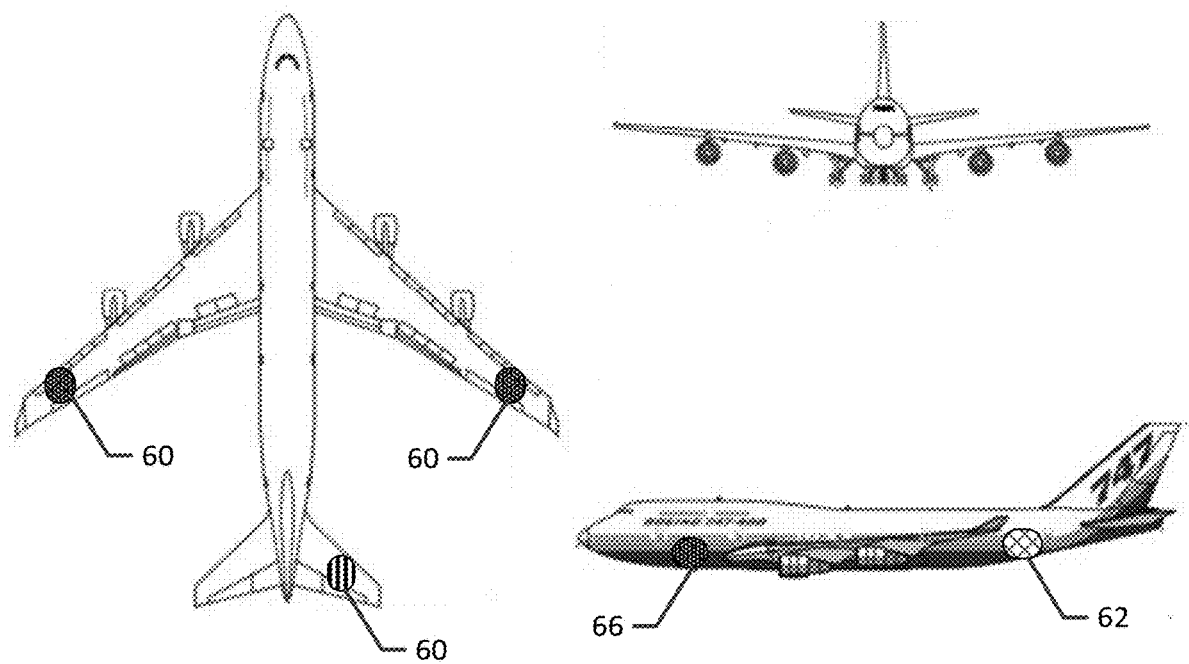

Having thus described embodiments of the present disclosure in general terms, reference will now be made to the accompanying drawings, which are not necessarily drawn to scale, and wherein:

FIG. 1 is a block diagram of a system that may be specifically configured in accordance with an example embodiment of the present disclosure;

FIG. 2 is a flowchart illustrating operations performed, such as by the system of FIG. 1, in accordance with an example embodiment of the present disclosure;

FIG. 3 is a data flow diagram illustrating the collection and processing of corrosion information in accordance with an example embodiment of the present disclosure;

FIG. 4 is a flowchart illustrating operations performed, such as by the system of FIG. 1, in accordance with another example embodiment of the present disclosure;

FIG. 5 is an image of an aircraft in which portions of the aircraft are highlighted to represent respective maintenance actions to be taken in accordance with another example embodiment of the present disclosure;

FIG. 6 is another image of an aircraft in which different portions of the aircraft are highlighted to represent some different maintenance actions than in FIG. 4 as a result of changes that occur over time;

FIG. 7 is yet another image of an aircraft in which the severity of a respective maintenance action has increased relative to the corresponding maintenance action depicted in FIG. 5 as a result of increased corrosion loss; and FIGS. 8A-8E are a time sequence of images of an aircraft depicting different maintenance actions that are suggested at different points in time in accordance with an example embodiment of the present disclosure.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

A method, system and computer program product are provided in accordance with an example embodiment in order to evaluate corrosion loss of a structure. Corrosion loss may be evaluated in any of various structures including aircraft, automobiles and other vehicles, bridges, buildings and other types of infrastructure, etc. These structures may be formed of a variety of materials including a variety of different metals.

Regardless of the type of structure, the method, system and computer program product of an example embodiment generate corrosion information from an inspection of the structure and then generate a corrosion model of the structure based upon the corrosion information. The corrosion model defines the corrosion loss for different portions of the structure. The method, system and computer program product of an example embodiment also generate a combined corrosion model based upon the corrosion model including the corrosion information and a baseline model of the structure including material types and thicknesses at respective locations on the structure. Based upon the combined corrosion model, the method, system and computer program product establish maintenance actions including modification of an inspection interval and, in some embodiments, depict an image of the structure with one or more areas of the image of the structure highlighted to represent respective maintenance actions.

The method, system and computer program product of this example embodiment therefore facilitate the performance of the maintenance actions in an efficient manner. For example, the inspection interval may be modified such that the structure is repeatedly inspected in accordance with a maintenance schedule that is sufficient to identify further corrosion but does not require re-inspections unnecessarily, thereby permitting the structure to remain in service as much as possible and avoiding the expenditure of resources on re-inspections that are unnecessary. Moreover, the method, system and computer program product of an example embodiment identify instances in which a structure is to be repaired or replaced sufficiently in advance that any necessary spares may be ordered and the repairs or replacement may be scheduled in an orderly manner, again to limit the structure being removed from service more often or for a longer period of time than is necessary.

A system 10 configured to evaluate corrosion loss in accordance with an example embodiment is depicted in FIG. 1. As shown, the system 10 includes an inspection system 12 configured to inspect a structure 13 to generate corrosion information and a computing device 14 configured to evaluate the corrosion information in combination with information relating to the structure in order to establish maintenance actions to be taken.

The inspection system 12 may be any of a variety of non-destructive inspection systems and, in one embodiment, is an x-ray inspection system configured to interrogate the structure 13 by the impingement of the structure with x-rays and the collection of x-rays returning following interaction with the structure. In this regard, the inspection system 12 may utilize an x-ray backscatter technique in order to inspect the structure 13 from a single side, thereby facilitating the inspection of areas of the structure that are otherwise difficult to visually inspect, such as hidden or remote locations that are generally referenced herein as areas of limited access. The backscattered x-ray provide the corrosion information for the portion of the structure 13 that has been interrogated.

The computing device 14 may be embodied by a variety of different computing devices, such as a computer workstation, a server, a distributed computing network, an inspection system or the like. Regardless of the manner in which the computing device 14 is embodied, the computing device of an example embodiment may be configured as shown in FIG. 1 so as to include, be associated with or otherwise be in communication with a processor 16 and a memory 18 and optionally with a communication interface 20 and/or a user interface 22.

In some embodiments, the processor 16 (and/or co-processors or any other processing circuitry assisting or otherwise associated with the processor) may be in communication with the memory device 18 via a bus for passing information among components of the computing device 14. The memory device 18 may be non-transitory and may include, for example, one or more volatile and/or non-volatile memories. In other words, for example, the memory device 18 may be an electronic storage device (e.g., a computer readable storage medium) comprising gates configured to store data (e.g., bits) that may be retrievable by a machine (e.g., a computing device like the processor). The memory device 18 may be configured to store information, data, content, applications, instructions, or the like for enabling the computing device 14 to carry out various functions in accordance with an example embodiment of the present disclosure. For example, the memory device 18 could be configured to buffer input data for processing by the processor 16. Additionally or alternatively, the memory device 18 could be configured to store instructions for execution by the processor 16.

The processor 16 may be embodied in a number of different ways. For example, the processor 16 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. The processor 16 may include one or more processors configured in tandem via the bus to enable independent execution of instructions, pipelining and/or multithreading.

In an example embodiment, the processor 16 may be configured to execute instructions stored in the memory device 18 or otherwise accessible to the processor. Alternatively or additionally, the processor 16 may be configured to execute hard coded functionality. As such, whether configured by hardware or software methods, or by a combination thereof, the processor 16 may represent an entity (e.g., physically embodied in circuitry) capable of performing operations according to an embodiment of the present disclosure while configured accordingly. Thus, for example, when the processor 16 is embodied as an ASIC, FPGA or the like, the processor may be specifically configured hardware for conducting the operations described herein. Alternatively, as another example, when the processor 16 is embodied as an executor of instructions, the instructions may specifically configure the processor to perform the algorithms and/or operations described herein when the instructions are executed. The processor 16 may include, among other things, a clock, an arithmetic logic unit (ALU) and logic gates configured to support operation of the processor.

In embodiments that include an communication interface 20, the communication interface may be any means such as a device or circuitry embodied in either hardware or a combination of hardware and software that is configured to receive and/or transmit data from/to a network and/or any other device or module in communication with the computing device 14, such as the inspection system 12, a display, a database or other storage device. In this regard, the communication interface 20 may include, for example, an antenna (or multiple antennas) and supporting hardware and/or software for enabling communications with a wireless communication network. Additionally or alternatively, the communication interface 20 may include the circuitry for interacting with the antenna(s) to cause transmission of signals via the antenna(s) or to handle receipt of signals received via the antenna(s). In some environments, the communication interface 20 may alternatively or also support wired communication. As such, for example, the communication interface 20 may include a communication modem and/or other hardware/software for supporting communication via cable, digital subscriber line (DSL), universal serial bus (USB) or other mechanisms.

In some embodiments, the computing device 14 may also optionally include a user interface 22 that may, in turn, be in communication with the processor 16 to provide an illustration of the maintenance actions to be taken relative to the structure and/or to receive user input. As such, the user interface 22 may include, for example, a keyboard, a mouse, a joystick, a display, a touch screen(s), touch areas, soft keys, a microphone, a speaker, or other input/output mechanisms. The processor 16 may comprise user interface circuitry configured to control at least some functions of one or more user interface elements such as, for example, a speaker, ringer, microphone, display, and/or the like. The processor 16 and/or user interface circuitry comprising the processor 16 may be configured to control one or more functions of one or more user interface elements through computer program instructions (e.g., software and/or firmware) stored on a memory accessible to the processor (e.g., memory device 18 and/or the like).

The operations performed, such as by the system 10 of FIG. 1, in accordance with an example embodiment will now be described by way of example, but not of limitation, with respect to the flowchart of FIG. 2 and the data flow of FIG. 3. As described above and as shown in block 30 of FIG. 2, the system 10 of an example embodiment includes an inspection system 12, such as a non-destructive inspection system, e.g., an x-ray inspection system, configured to inspect a structure 13 to generate corrosion information. See also block 43 of FIG. 3. In an embodiment that includes an x-ray inspection system, x-rays are directed to a structure 13 from a single side of the structure and x-rays backscattered as a result of interaction with the interrogated portion of the structure are then captured. The backscattered x-rays provide the corrosion information 43 for the portion of the structure 13 that has been interrogated. In one scenario, the structure 13 may be interrogated upon its manufacture, when placed in the field or following a repair in order to generate a baseline model 44 for the structure 13. Thereafter, following placement of the structure 13 in service, subsequent interrogation of the structure and the backscattered signals collected therefrom may be compared to the baseline model in order to determine the difference therebetween and, based upon the difference, determine the extent of the corrosion loss for that portion of the structure that has been inspected. For example, in one embodiment, the baseline model 44 represents a model of a new structure 13 and thus would likely be substantially free from corrosion. In another embodiment, the baseline model 44 may represent corrosion information or a corrosion model of a structure 13 in service. As such, the baseline model 44 represents corrosion information of the structure 13 acquired at a point in time previous to the corrosion information 43 being generated at step 30 using the inspection system 12.

As shown in block 32 of FIG. 2 and block 45 of FIG. 3, the system 10 also includes a computing device 14, such as the processor 16, configured to generate a corrosion model of the structure 13 based upon the corrosion information 43 received from the inspection system 12. In this regard, the computing device 14, such as the processor 16, is configured to access information regarding the structure 13 stored, for example, by the memory 18. The information regarding the structure 13 defines a model 46 of the structure including the physical shape and dimensions of the structure, such as in relation to a coordinate system established by the structure. As such, the computing device 14, such as the processor 16, of this example embodiment is configured to overlay the corrosion information collected by the inspection system 12 upon the model 46 of the structure to generate the corrosion model 45. In this regard, the inspection system 12 not only collects information regarding the corrosion loss, but also associates the information regarding corrosion loss with a respective location upon the structure 13. Thus, the computing device 14, such as the processor 16, of an example embodiment is configured to associate the corrosion information 43, such as the information regarding corrosion loss, to corresponding locations upon the model 46 of the structure 13. As such, the corrosion information 43 collected by the inspection system 12 is effectively mapped to the model 46 of the structure 13 by the computing device 14 in order to generate the resulting corrosion model 45. The corrosion model 45 provides an indication of the corrosion loss at each of a plurality of locations upon the structure 13.

The system 10 and, more particularly, the computing device 14, such as the processor 16, of an example embodiment is also configured to generate a combined corrosion model 47 based upon the corrosion model 45 including the corrosion information 43 and a baseline model 44 of the structure 13 including material type and thicknesses at respective locations on the structure. See block 34 of FIG. 2. In this regard, the computing device 14, such as a processor 16, is configured to access information, such as may be stored by the memory 18, a database or an aircraft manual accessible by the processor 16, that defines the various types of materials, such as different types of metals, from which different portions of the structure 13 are constructed. See block 48 of FIG. 3. While some structures 13 may be constructed of a single type of material, other structures may be constructed of different types of material, such that one portion of a structure is formed of a first metal, a second portion of the structure is formed of a second metal and a third portion of the structure is formed of a third metal, with each of the first, second and third metals being different from one another. The computing device 14, such as the processor 16, of this example embodiment is also configured to access information, such as may be stored by the memory 18, a database or an aircraft manual, accessible by the processor, that identifies the thickness of the structure 13, such as the initial thickness of the structure prior to corrosion loss, at respective locations on the structure. See also block 48 of FIG. 3. In some example embodiments, the computing device 14, such as the processor 16, is also configured to generate the combined corrosion model 47 based upon the environment in which the structure 13 is disposed. As such, the computing device 14, such as the processor 16, of this example embodiment is configured to access environmental information, such as may be stored by the memory 18 or a database, indicating the environment, such as the geography, the temperature, the humidity or the like, in which the structure 13 is disposed. See block 49 of FIG. 3. For example, the environment may be a humid environment or, alternatively, a dry environment. Further, the environment may be one in which the structure 13 is exposed to salt water.

Based upon the material type and the environment as provided by blocks 48 and 49, respectively, of FIG. 3, the computing device 14, such as the processor 16, of an example embodiment is configured to determine the rate at which the material is expected to corrode, that is, the rate of corrosion loss. In this regard, the computing device 14, such as the processor 16, of an example embodiment may take into account the type, alloy and temper of the material and the environmental conditions to which the material is exposed during usage in order to determine the rate of corrosion. In some embodiments, the computing device 14, such as the processor 16, also takes into account the initial thickness of the material from which the different portions of the structure 13 are formed as well as the corrosion loss of the different portions of the structure and the time in service for the different portions of the structure during which the corrosion loss was experienced. Based thereupon, the computing device 14, such as the processor 16, of this example embodiment is configured to determine the current or remaining thickness of the material at each of a plurality of different locations on the structure 13. The current thickness may be determined based upon a difference between the initial thicknesses and the corrosion loss at different respective locations on the structure. Consequently, the combined corrosion model 47 generated by the computing device 14, such as the processor 16, may define at least the current thickness of different portions of the structure 13 and, in some embodiments, the rate at which further corrosion of the different portions of the structure is expected to proceed.

As shown in block 36 of FIG. 2 and block 50 of FIG. 3, the system 10 also includes the computing device 14, such as the processor 16 or the like, configured to establish maintenance actions based upon the combined corrosion model 47. In this regard, the computing device 14, such as the processor 16, of an example embodiment is configured to determine the maintenance actions, if any, to be performed at respective locations and/or on respective portions of the structure 13 based upon the current thickness of the material at the respective locations on the structure and, in some embodiments, also upon the rate at which additional corrosion loss is expected to occur. For example, the computing device 14, such as the processor 16, is configured to access information, such as stored by the memory 18 or a database, regarding the thresholds in terms of material thickness at which various maintenance actions are to be taken for different portions of the structure 13 depending upon, for example, the material from which the different portions of the structure are formed, the loads under which the different portions of the structure are placed in service or the like. Examples of the maintenance actions include a modification of the inspection interval, identification of a repair to be made to the structure 13, causing a spare part for the structure to be ordered or identification of at least a portion of the structure to be replaced.

A maintenance schedule is generally associated with a structure 13 and may be stored, for example, by memory 18 or a database. The computing device 14, such as the processor 16, is configured to access the maintenance schedule. For an aircraft, since the maintenance schedule may be dependent upon the recorded flight hours, the computing device 14, such as the processor 16, may also have access to the flight log of the aircraft in order to determine when upcoming maintenance actions are slated to be performed. Depending upon the combined corrosion model 47, the computing device 14, such as the processor 16, is configured to modify the maintenance schedule for the structure, such as by increasing the interval between inspections in instances in which the corrosion loss is less than anticipated or reducing the interval between inspections in which case the corrosion loss is more than expected or if the corrosion loss is occurring at such a rate that the additional corrosion loss prior to the next originally scheduled inspection may be to such a degree that the remaining thickness of the structure 13 at the time of the next originally scheduled inspection will be less than is acceptable.

As such, the computing device 14, such as the processor 16, of an example embodiment is configured to determine the anticipated thickness of the material from which the structure 13 is formed at a respective location at the time of the next scheduled inspection. This determination is based upon the current thickness and the rate at which additional corrosion is expected to occur. If the anticipated thickness at the next scheduled inspection, based on the anticipated rate of corrosion, is less than a predefined minimum acceptable threshold, the inspection interval may be reduced to a point in time at which the anticipated thickness of the material at that point in time is greater than the predefined minimum acceptable threshold. Alternatively, in an instance in which the computing device 14, such as the processor 16, determines that the thickness of the material at the next scheduled inspection will exceed the predefined minimum acceptable threshold even after taking into account the additional anticipated corrosion loss, the inspection interval may be extended or increased until such time that additional corrosion loss has occurred but the anticipated thickness of the material is still greater than the predefined minimum acceptable threshold, such as by exceeding the predefined minimum acceptable threshold by a predetermined amount, such as 5%, 10% or the like. By modifying the maintenance schedule based upon the combined corrosion model, the method and system 10 of an example embodiment increase the likelihood that maintenance actions, such as the repair or replacement of a portion of a structure, will be identified prior to the material thickness falling below the predefined minimum acceptable threshold, while reducing unnecessary inspections so as to save labor and other inspection resources. Moreover, the method and system 10 of this example embodiment facilitate movement, either partially or entirely, from a time-based maintenance plan to a more efficient, condition-based maintenance plan.

As noted above, other maintenance actions include identifying a repair to be made to the structure, causing a spare part for the structure 13 to be ordered or identifying at least a portion of the structure to be replaced. In this regard, different predefined material thickness thresholds may be established and stored, such as in memory 18 or a database, that defines instances in which a repair should be made to the structure, a spare part should be ordered or at least a portion of the structure should be replaced. By identifying instances in which a repair should be made to the structure 13 or at least a portion of the structure should be replaced, the method and system of an example embodiment may reliably maintain the structure in an operable condition. While various types of repairs may be made to the structure, one type of repair involves the application of a repair patch to a portion of the structure 13 in order to structurally reinforce that portion of the structure. As such, the computing device 14, such as the processor 16, of an example embodiment may establish a maintenance action by identifying a repair to be made to the structure and then determine the size of the repair based upon the combined corrosion model. See blocks 52 and 54 of FIG. 4. In this regard, the size of the repair may encompass the portion of the structure 13 identified by the combined corrosion model to be out of tolerance by having a thickness that is less than the predefined material thickness threshold associated with a repair. As such, the computing device 14, such as the processor 16, of this embodiment may then size the repair patch based upon the size of the repair, such as by sizing the repair patch to equal the size of the repair or by sizing the repair patch to be larger than the size of the repair, such as by a predefined amount, e.g., 5% or 10% larger or the like. See block 56 of FIG. 4.

For some parts of the structure 13, a spare part must be ordered some time prior to effecting the repair. Thus, the computing device 14, such as the processor 14, has access to information, such as may be stored in memory 18 or a database, regarding the parts of the structure 13 for which spare parts must be ordered and, in some embodiments, the lead times required for ordering of those spare parts. Thus, the predefined material thickness threshold of those parts of the structure 13 that require the ordering of a spare part in order to affect a repair may be established such that sufficient time is provided to order the spare part and to receive the spare part before additional corrosion loss occurs that requires the repair to be made. As such, repairs that require the ordering and receipt of spare parts may be planned more efficiently in advance such that the time that the structure 13 must be taken out of service in order to effect the repair involving the spare part is limited.

As shown in block 38 of FIG. 2, the computing device 14, such as the processor 16, the user interface 22 or the like, of an example embodiment is configured to depict the image of the structure 13. The image of the structure 13 that is depicted may be any of a variety of different forms including, for example, a perspective view of the structure, two or more plan views of the structure or the like. In this regard, the image of the structure 13 may be depicted upon a display. In this example embodiment and as shown in block 40 of FIG. 2, the computing device 14, such as the processor 16, the user interface 22 or the like, is also configured to highlight one or more areas of the image of the structure 13 to represent the current corrosion level on the structure and the respective maintenance actions that are suggested for the respective areas. For example, one image may highlight corrosion on the structure wherein different levels of corrosion are highlighted with different colors, textures, shadings, etc. A second image may be generated that illustrates the maintenance actions suggested for the respective areas. Moreover, a third image may illustrate both the current corrosion levels on the structure 13 and the recommended maintenance actions. For example, the maintenance actions associated with modification of the inspection interval may be highlighted in one manner, such as in one color, while the maintenance actions associated with a repair to be made to the structure 13, causing a spare part to be ordered for the structure or identifying at least a portion of the structure to be replaced may be separately and differently highlighted with, for example, second, third and fourth colors, respectively. While the areas of the image of the structure 13 associated with different maintenance actions may be highlighted with different colors, the areas of the image may be highlighted in different manners in other embodiments, such as by being highlighted with different styles, shadings, patterns or with differences in other visible characteristics. Further, the size of the areas of the image that are highlighted correspond in location and, in some embodiments, size to the areas of the structure 13 for which a maintenance action has been recommended. As such, a technician or other user may view the highlighted image of the structure 13 and quickly determine the locations of the corrosion and the maintenance actions slated for the different areas of the structure based on the levels of corrosion identified for each specific area.

As shown in FIG. 5 in which the structure 13 is an aircraft, several areas of the image of the aircraft are highlighted to represent respective maintenance actions, such as those areas 60 for which the inspection interval has been modified, those areas 62 in which a repair is scheduled to be made and those areas 64 in which the corresponding portion of the aircraft is scheduled to be replaced as indicated by the legend of FIG. 5. The computing device 14, such as the processor 16, the user interface 22 or the like, is also configured to modify the highlighting of the one or more areas of the image of the structure to represent changes in the respective maintenance actions to be taken over time. See block 42 of FIG. 2. In this regard, FIG. 6 is an image of the same aircraft as in FIG. 5, although at a later time. A comparison of FIGS. 5 and 6 illustrates an instance in which the portion of the aircraft that was identified in FIG. 4 to be in need of replacement has been replaced (since the area 64 of FIG. 5 is no longer highlighted), but another area 66 of the aircraft has been identified to have the maintenance interval modified in FIG. 6. By way of further example, FIG. 7 is an image of the same aircraft as in FIGS. 5 and 6, although at a later time than the time associated with either of the other figures. A comparison of FIGS. 5 and 7 indicates an instance in which the area 62 indicated in FIG. 5 to be in need of repair has not been repaired and, as such, the same area has now been identified in FIG. 7 to still be in need of replacement. Thus, a time sequence of images of the structure in which one or more areas of the images are highlighted to represent respective maintenance actions can provide significant information regarding the evolution of the effects of corrosion loss and the corresponding maintenance actions recommended and performed over time. It should be realized that each image in the time sequence of images may be generated using the method described in FIG. 2. For example, the structure of FIG. 5 may represent a current corrosion level at time $T_1$. FIG. 6 may represent a current corrosion level at time $T_2$, wherein the information used to generate FIG. 5 is used as the baseline model to generate the combined corrosion model used to generate FIG. 6. Similarly, FIG. 5 or 6 may serve as the baseline model to generate the combined corrosion model used to generate the maintenance actions shown in FIG. 7.

It should be further realized that although FIGS. 5-7 each represent a repair state at a specific point in time, that the corrosion model and the associated maintenance action images may be generated as time-lapse models. For example, in one embodiment a corrosion model of a certain area of the structure may be acquired at time $T_1$. Subsequently, a second corrosion model of the same area of the structure may be acquired at time $T_2$ . . . and an nth corrosion model of the same area of the structure may be acquired at time $T_n$. As a result, the first, second . . . nth corrosion models may be viewed sequentially as a film to enable the operator to view the progression of corrosion on the structure.

Figure 8A:
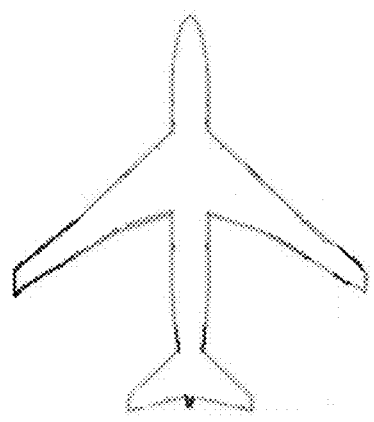
Figure 8B:
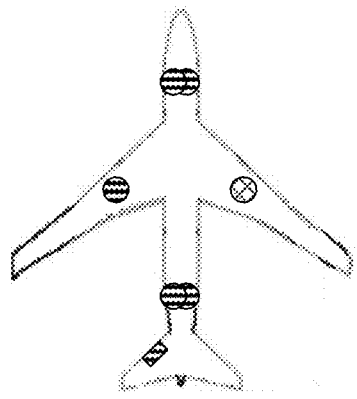
Figure 8C:
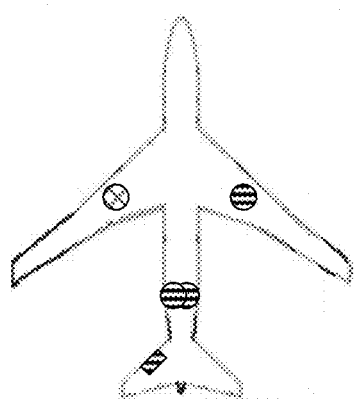
Figure 8D:
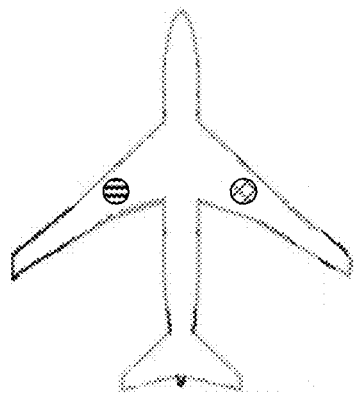
Figure 8E:
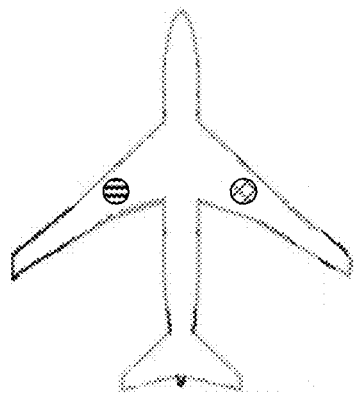

By way of another example of the time sequence of images generated in accordance with an example embodiment, FIGS. 8A-8E depict a series of images representative of the repair state of an aircraft at different progressively increasing points in time. In this regard, the baseline model 44 depicted in FIG. 8A does not identify any areas in need of maintenance. However, the images depicted in FIGS. 8B-8E illustrate areas in need of different maintenance actions at corresponding times $T_1$, $T_2$, $T_3$ and $T_4$. As represented by the different types of cross-hatching, the some areas have had the inspection interval decreased (indicative of advancing corrosion that does not yet trigger a repair action), other areas are denoted for repair, while still other areas are indicated to be in need of replacement. For example a comparison of the areas on a forward portion of the fuselage in FIGS. 8B-8D show the areas to initially have a decreased inspection interval followed by an indication of a needed repair followed by FIG. 8D that no longer indicates a need for maintenance action, presumably as a result of a repair being made between times $T_2$ and $T_3$ associated with FIGS. 8C and 8D, respectively.

Moreover, the processor 16 is also configured to extrapolate the rate of corrosion in each area based on the a priori information, i.e. the corrosion models, previously generated. Specifically, the processor 16 may be configured to estimate the level of corrosion in the future based on the actual levels of corrosion currently identified using the corrosion model. In operation, the user may therefore be able to visually observe an image of the structure that includes visual indications of corrosion, wherein the visual indications of corrosion represent actual corrosion information and projected/extrapolated corrosion information. The combination of the actual and extrapolated corrosion information may be acquired and/or calculated for the entire service life of the structure. In operation, as the structure progresses thru its service life, the extrapolated corrosion information would be replaced with the actual corrosion information, acquired via x-ray scanning, to further refine the accuracy of the combined model.

Thus, both the actual corrosion information and the extrapolated corrosion information may be used to generate the repair state images shown in FIGS. 5-7. In this manner, maintenance schedules may be set well in advance of when the maintenance action is required and/or predicted to be acquired. Additionally, parts may be ordered will in advance of the maintenance actions. As a result, a list of spare parts that may be required throughout the life of the structure may be estimated to generate a cost estimate of the potential repair/replacement costs associated with the structure for the life of the structure.

As described above, FIGS. 2-4 illustrate flowcharts of a system 10, method, and computer program product according to example embodiments of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory device 18 of a computing device 14 employing an embodiment of the present invention and executed by a processor 16 of the computing device. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, may be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method of evaluating corrosion loss, the method comprising:
inspecting a structure to generate corrosion information;

generating a corrosion model of the structure based upon the corrosion information;

generating a combined corrosion model based upon the corrosion model and a baseline model of the structure including material types and thicknesses at respective locations on the structure, wherein the combined corrosion model comprises extrapolated levels of corrosion in the future based on the corrosion model, the baseline model, and the material types and thicknesses; and establishing maintenance actions including modification of an inspection interval based upon the combined corrosion model, wherein the inspection interval is reduced in response to the combined corrosion model indicating a higher level of corrosion in the future relative to an anticipated level of corrosion.

2. A method according to claim 1 further comprising:
depicting an image of the structure; and
highlighting one or more areas of the image of the structure to represent respective maintenance actions.

3. A method according to claim 2 further comprising modifying the highlighting of the one or more areas of the image of the structure to represent changes in the respective maintenance actions to be taken over time.

4. A method according to claim 2 wherein highlighting the one or more areas of the image of the structure comprise causing the one or more areas of the image of the structure to be depicted in a color, style, shading, or pattern associated with the respective maintenance action.

5. A method according to claim 1 wherein generating the combined corrosion model is further based upon an environment in which the structure is disposed to determine a future rate of corrosion.

6. A method according to claim 1 wherein modification of the inspection interval comprises accessing a maintenance schedule for the structure and modifying the maintenance schedule for the structure.

7. A method according to claim 1 wherein establishing maintenance actions comprises identifying a repair to be made to the structure, causing a spare part for the structure to be ordered or identifying at least a portion of the structure to be replaced.

8. A method according to claim 1 wherein establishing the maintenance actions comprises identifying a repair to be made to the structure, and wherein the method further comprises determining a size of the repair based upon the combined corrosion model and sizing a repair patch based upon the size of the repair.

9. A system for evaluating corrosion loss, the system comprising:
an inspection system configured to inspect a structure to generate corrosion information; and
a computing device configured to generate a corrosion model of the structure based upon the corrosion information, wherein the computing device is also configured to generate a combined corrosion model based upon the corrosion model and a baseline model of the structure including material types and thicknesses at respective locations on the structure, wherein the combined corrosion model comprises extrapolated levels of corrosion in the future based on the corrosion model, the baseline model, and the material types and thicknesses, and wherein the computing device is further configured to establish maintenance actions including modification of an inspection interval based upon the combined corrosion model, and wherein the inspection interval is reduced in response to the combined corrosion model indicating a higher level of corrosion in the future relative to an anticipated level of corrosion.

10. A system according to claim 9 wherein the inspection system comprises an x-ray inspection system.

11. A system according to claim 9 wherein the computing device is further configured to cause an image of the structure to be depicted and to cause one or more areas of the image of the structure to be highlighted to represent respective maintenance actions.

12. A system according to claim 11 wherein the computing device is further configured to modify highlighting of the one or more areas of the image of the structure to represent changes in the respective maintenance actions to be taken over time.

13. A system according to claim 11 wherein the computing device is further configured to cause the one or more areas of the image of the structure to be highlighted by causing the one or more areas of the image of the structure to be depicted in a color, style, shading, or pattern associated with the respective maintenance action.

14. A system according to claim 9 wherein the computing device is further configured to generate the combined corrosion model based upon an environment in which the structure is disposed to determine a future rate of corrosion.

15. A system according to claim 9 wherein the computing device is further configured to modify the inspection interval by accessing a maintenance schedule for the structure and modifying the maintenance schedule for the structure.

16. A system according to claim 9 wherein the computing device is further configured to establish maintenance actions by identifying a repair to be made to the structure, causing a spare part for the structure to be ordered or identifying at least a portion of the structure to be replaced.

17. A system according to claim 9 wherein the computing device is further configured to establish the maintenance actions by identifying a repair to be made to the structure, and wherein the computing device is further configured to determine a size of the repair based upon the combined corrosion model and size a repair patch based upon the size of the repair.

18. A computer program product configured to evaluate corrosion loss, the computer program product comprising a non-transitory computer readable storage medium, the non-transitory computer readable storage medium comprising instructions that, when executed, are configured to cause:
generating a corrosion model of a structure based upon corrosion information collected during an inspection of the structure;
generating a combined corrosion model based upon the corrosion model and a baseline model of the structure including material types and thicknesses at respective locations on the structure, wherein the combined corrosion model comprises extrapolated levels of corrosion in the future based on the corrosion model, the baseline model, and the material types and thicknesses; and
establishing maintenance actions including modification of an inspection interval based upon the combined corrosion model, wherein the inspection interval is reduced in response to the combined corrosion model indicating a higher level of corrosion in the future relative to an anticipated level of corrosion.

19. A computer program product according to claim 18 wherein the non-transitory computer readable storage medium further comprises instructions that, when executed, are configured to cause:
depicting an image of the structure; and highlighting one or more areas of the image of the structure to represent respective maintenance actions by causing the one or more areas of the image of the structure to be depicted in a color, style, shading, or pattern associated with the respective maintenance action.

20. A computer program product according to claim 19 wherein the non-transitory computer readable storage medium further comprises instructions that, when executed, are configured to cause modification of the highlighting of the one or more areas of the image of the structure to represent changes in the respective maintenance actions to be taken over time.

\* \* \* \* \*